United States Patent
Lin et al.

(10) Patent No.: US 9,519,274 B2
(45) Date of Patent: Dec. 13, 2016

(54) ELECTRONIC DEVICE AND METHOD FOR ADJUSTING FOOL-PROOFING FUNCTIONS OF OPERATIONS USING THE ELECTRONIC DEVICE

(71) Applicant: Shenzhen Airdrawing Technology Service Co., Ltd, Shenzhen (CN)

(72) Inventors: Ke-Fei Lin, New Taipei (TW);
Shan-Chuan Jeng, New Taipei (TW);
Chien-Fa Yeh, New Taipei (TW);
Chung-I Lee, New Taipei (TW)

(73) Assignee: Shenzhen Airdrawing Technology Service Co., Ltd, Shenzhen (CN)

( * ) Notice: Subject to any disclaimer, the term of this patent is extended or adjusted under 35 U.S.C. 154(b) by 415 days.

(21) Appl. No.: 14/203,571

(22) Filed: Mar. 11, 2014

(65) Prior Publication Data
US 2014/0277610 A1  Sep. 18, 2014

(30) Foreign Application Priority Data
Mar. 13, 2013  (CN) .................. 2013 1 00795555

(51) Int. Cl.
*G05B 9/02* (2006.01)
(52) U.S. Cl.
CPC ..................... *G05B 9/02* (2013.01)
(58) Field of Classification Search
CPC ............. G05B 9/02; G05B 19/406; G05B 2219/35285; G06Q 10/06; G06Q 10/063112; G06Q 10/063114; G06Q 10/06395
See application file for complete search history.

(56) References Cited

U.S. PATENT DOCUMENTS

| | | | |
|---|---|---|---|
| 2011/0258021 A1 | 10/2011 | Mumaw et al. | |
| 2012/0293518 A1* | 11/2012 | Geisner | G06F 3/011 345/474 |
| 2013/0159228 A1* | 6/2013 | Meijer | G06F 9/4443 706/14 |
| 2013/0311954 A1* | 11/2013 | Minkkinen | G06F 3/04812 715/862 |
| 2015/0107088 A1* | 4/2015 | Sagara | G06Q 10/063114 29/592.1 |

* cited by examiner

*Primary Examiner* — Sean Shechtman
*Assistant Examiner* — Steven Garland
(74) *Attorney, Agent, or Firm* — Zhigang Ma

(57) ABSTRACT

In a method for an electronic device to adjust fool-proofing functions of operations, an algorithm corresponding to each of the operations, and ranges for triggering the fool-proofing functions of the operations are preset. When an operation inputted by an operator is obtained, the method calculates a skilled value of the operation according to reference parameters of the operator and an algorithm corresponding to the operation. The method further determines a fool-proofing function of the operation that is triggered by the electronic device according to the skilled value and the ranges for triggering the fool-proofing functions, and adjusts the electronic device to execute the determined fool-proofing function.

15 Claims, 3 Drawing Sheets

| Reference parameters \ Operators | Operator A | Operator B | Operator C |
|---|---|---|---|
| probability ($\alpha$) | 0.5% | 1% | 2% |
| seniority ($\beta$) | 3 | 2 | 1 |
| performance score ($\gamma$) | 90 | 80 | 70 |

FIG. 3

ELECTRONIC DEVICE AND METHOD FOR ADJUSTING FOOL-PROOFING FUNCTIONS OF OPERATIONS USING THE ELECTRONIC DEVICE

BACKGROUND

1. Technical Field

Embodiments of the present disclosure relate to fool-proofing technology, and particularly to an electronic device and a method for adjusting fool-proofing functions of operations using the electronic device.

2. Description of Related Art

During manufacturing of a product, an error in one of the manufacturing process operation may result in a serious loss, for example, delaying a manufacturing schedule of the product or affecting the safety of an operator. In order to reduce rates of error, a fool-proofing function executed by an electronic device is applied in the operation. However, most fool-proofing function usually increases the time to accomplish the operation. For example, such fool-proofing function as inputting password twice to confirm the operation, or confirming the operation by using two different operators. Furthermore, if the skill level of each operator is different such as, when a skilled operator and an unskilled operator use the same fool-proofing function, time may be wasted and the operation will not have a high efficiency. Therefore, there is room for improvement in the art.

BRIEF DESCRIPTION OF THE DRAWINGS

FIG. 3 is a chart illustrating one embodiment of values corresponding to reference parameters of different operators.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean "at least one."

In general, the word "module," as used herein, refers to logic embodied in hardware or firmware unit, or to a collection of software instructions, written in a programming language. One or more software instructions in the modules may be embedded in firmware unit, such as in an EPROM. The modules described herein may be implemented as either software and/or hardware modules and may be stored in any type of non-transitory computer-readable medium or other storage device. Some non-limiting examples of non-transitory computer-readable media may include CDs, DVDs, BLU-RAY, flash memory, and hard disk drives.

Figure 1:
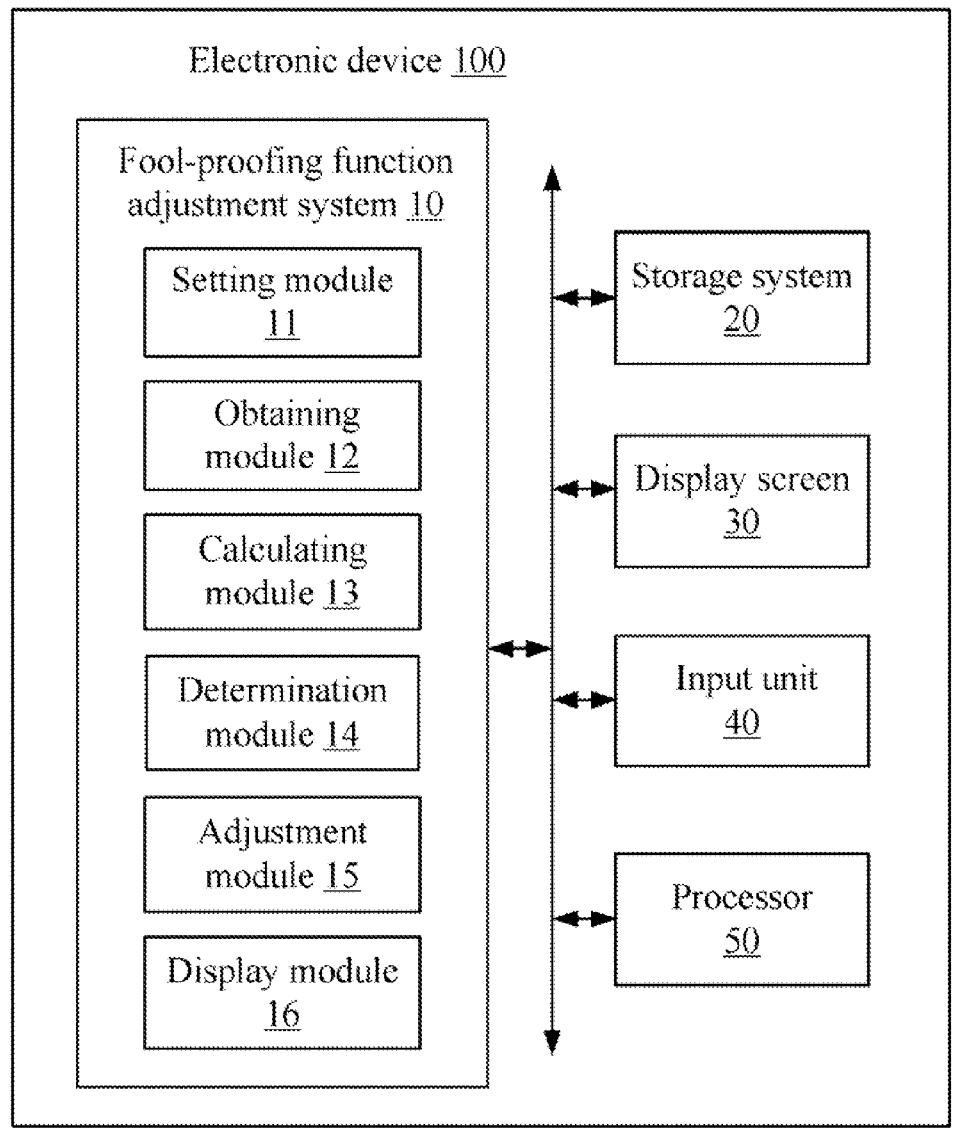
FIG. 1 is a schematic block diagram of one embodiment of an electronic device including a fool-proofing function adjustment system.

FIG. 1 is a schematic block diagram of one embodiment of an electronic device 100 including a fool-proofing function adjustment system 10. In the embodiment, the electronic device 100 may be a mobile phone, a notebook computer, a personal digital assistant (PDA), or a computing device, for example.

The fool-proofing function adjustment system 10 obtains operations inputted by operators, and adjusts the fool-proofing functions of the operations using the electronic device 100 according to reference parameters inputted by the operators. The operations may result in serious loss when an error occurs, an example of a serious loss may be the scrapping parts of a product (hereinafter abbreviated as "scrapping operation"). The reference parameters are parameters that identify the skill level of the operators. The reference parameters may include, but is not limited to, a probability that errors occur on the operations, a seniority that indicates working years of the operators, and a performance score that evaluates the performance of the operators in daily work.

FIG. 3 is a chart illustrating one embodiment of values corresponding to the reference parameters of different operators. In the embodiment, the probability (denoted as "α") of operators A, B and C is respectively denoted as ratios of 0.5%, 1%, and 2%, the seniority (denoted as "β") of the operators A, B and C is respectively denoted as 3 years, 2 years and 1 year, and the performance score (denoted as "γ") of the operators A, B and C is respectively denoted as scores 90, 80, and 70.

Referring back to FIG. 1, the electronic device 100 further includes a storage system 20, a display screen 30, an input unit 40, and a processor 50. The display screen 30 displays a user interface of the adjusted fool-proofing function. The input unit 40 provides an input interface to receive operations inputted by the operators. The storage system 20 may be a memory (e.g., random access memory, flash memory, hard disk drive) of the electronic device 100 to store the reference parameters. The processor 50 executes one or more computerized codes and other applications of the electronic device 100 to provide functions of the fool-proofing function adjustment system 10.

The fool-proofing function adjustment system 10 includes a setting module 11, an obtaining module 12, a calculating module 13, a determination module 14, an adjustment module 15, and a display module 16. The modules 11-16 comprise computerized codes in the form of one or more programs that are stored in the storage system 20. The computerized codes include instructions that are executed by the processor 50 to provide functions for the modules.

The setting module 11 presets an aggregate of the operations, an aggregate of the fool-proofing functions of the operations, an algorithm corresponding to each of the operations, and ranges for triggering the fool-proofing functions of the operations. The aggregate of the operations and the aggregate of the fool-proofing functions of the operations are stored in the storage system 20. In one embodiment, one operation corresponds to one or more fool-proofing functions, and each fool-proofing function corresponds to one range. When a skilled value is calculated according to an algorithm corresponding to an operation, the fool-proofing function adjustment system 10 determines a fool-proofing function of the operation that needs to be triggered by the electronic device 100 according to the skilled value and the ranges. The skilled value indicates the skill level of an operator.

In one embodiment, the setting module 11 sets the scrapping operation as the operation. Fool-proofing functions of the scrapping operation comprise a fool-proofing function A and a fool-proofing function B. An algorithm of the scrapping operation is set as "Fp(x)=(1−α(x))×β(x)×γ(x)". The Fp(x) is the skilled value, the α(x) is the probability, the β(x) is the seniority, and the γ(x) is the performance score. When the skilled value is in a first range, for example, $150 \leq Fp(x) < 250$, a first fool-proofing function of the scrapping operation is triggered, for example, the fool-proofing function A.

When the skilled value is in a second range, for example, Fp(x)<150, a second fool-proofing function of the scrapping operation is triggered, for example, the fool-proofing function B. When the skilled value is in a third range, for example, Fp(x)≥250, the fool-proofing functions of the scrapping operation are not triggered.

The obtaining module 12 obtains an operation inputted by an operator using the input unit 40. For example, the operation is the scrapping operation.

The calculating module 13 calculates a skilled value of the operation according to reference parameters of the operator and an algorithm corresponding to the operation. For example, if the algorithm corresponding to the operation is denoted as "Fp(x)=(1−α(x))×β(x)×γ(x)", the calculating module 13 calculates a skilled value of an operator A in FIG. 3 as "Fp(x)=268.65", calculates a skilled value of an operator B in FIG. 3 as "Fp(x)=158.4", and calculates a skilled value of an operator C in FIG. 3 as "Fp(x)=68.6".

The determination module 14 determines a fool-proofing function of the operation that needs to be triggered by the electronic device 100 according to the skilled value and the ranges for triggering the fool-proofing functions. For example, if a skilled value "Fp(x)=268.65" is in a range of "Fp(x)≥250", the determination module 14 determines that the electronic device 100 does not need to trigger the fool-proofing functions of the operation. If a skilled value "Fp(x)=158.4" is in a range of "150≤Fp(x)<250", the determination module 14 determines that the electronic device 100 needs to trigger the first fool-proofing function (e.g., the fool-proofing function A). If a skilled value "Fp(x)=68.6" is in a range of "Fp(x)<150", the determination module 14 determines that the electronic device 100 needs to trigger the second fool-proofing function (e.g., the fool-proofing function B).

The adjustment module 15 adjusts the electronic device 100 to execute the determined fool-proofing function. For example, if the electronic device 100 does not need to trigger the fool-proofing function, the adjustment module 15 adjusts the electronic device 100 to have no fool-proofing function. If the electronic device 100 needs to trigger the first fool-proofing function, the adjustment module 15 adjusts the electronic device 100 to execute the first fool-proofing function. If the electronic device 100 needs to trigger the second fool-proofing function, the adjustment module 15 adjusts the electronic device 100 to execute the second fool-proofing function.

The display module 16 displays a user interface of the determined fool-proofing function on the display screen 30. For example, if the electronic device 100 does not have a fool-proofing function, the scrapping operation takes effect directly. If the electronic device 100 is in the first fool-proofing function, a record of errors of the scrapping operation is displayed on the display screen 30. If the electronic device 100 is in the second fool-proofing function, a dialog box is displayed on the display screen 30 to remind the operator to confirm whether the scrapping operation needs to be executed.

In this disclosure, the fool-proofing function of the operation is adjusted according to the skill level of the operators. An operator (e.g., the operator A) with a high skill level can take effect of the operation directly to avoid wasting time when the electronic device 100 have no fool-proofing function. An operator (e.g., the operator C) with a low skill level confirms the operation twice to reduce rates of errors when the electronic device 100 executes the second fool-proofing function.

Figure 2:
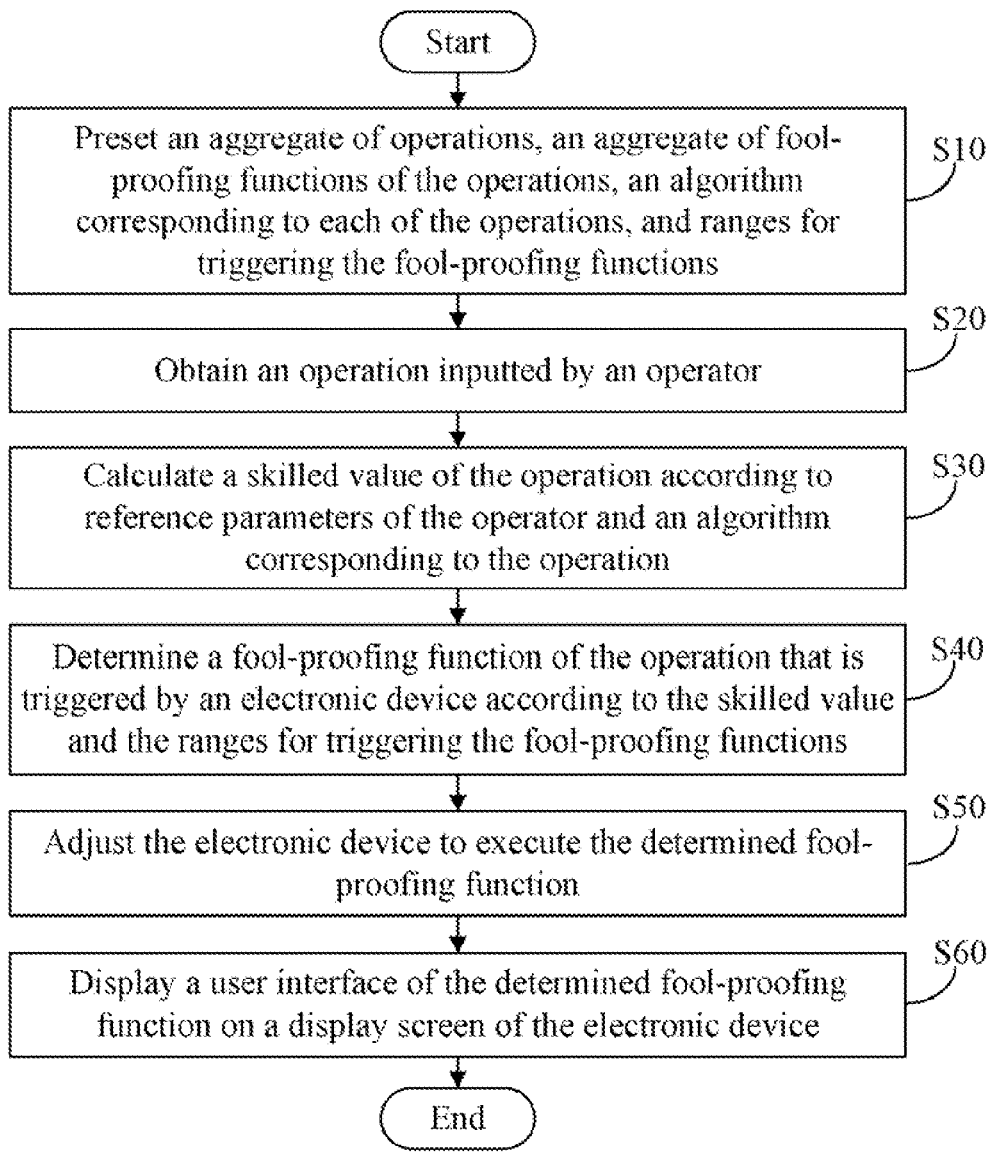
FIG. 2 is a flowchart illustrating one embodiment of a method for adjusting fool-proofing functions of operations using the electronic device of FIG. 1.

FIG. 2 is a flowchart illustrating one embodiment of a method for adjusting fool-proofing functions of operations using the electronic device 100 of FIG. 1. Depending on the embodiment, additional steps may be added, others deleted, and the ordering of the steps may be changed.

In step S10, the setting module 11 presets an aggregate of the operations, an aggregate of the fool-proofing functions of the operations, an algorithm corresponding to each of the operations, and ranges for triggering the fool-proofing functions of the operations.

In step S20, the obtaining module 12 obtains an operation inputted by an operator using the input unit 40.

In step S30, the calculating module 13 calculates a skilled value of the operation according to reference parameters of the operator and an algorithm corresponding to the operation. The reference parameters are parameters that identify the skill level of the operators. The reference parameters may include, but not limited to, a probability that errors occur on the operation, a seniority that indicates working years of the operators, and a performance score that evaluates the performance of the operators in daily work.

In step S40, the determination module 14 determines a fool-proofing function of the operation that needs to be triggered by the electronic device 100 according to the skilled value and the ranges for triggering the fool-proofing functions. In one embodiment, when the skilled value is in a first range, a first fool-proofing function of the operation is triggered. When the skilled value is in a second range, a second fool-proofing function of the operation is triggered. When the skilled value is in a third range, the fool-proofing functions of the operation are not triggered.

In step S50, the adjustment module 15 adjusts the electronic device 100 to execute the determined fool-proofing function.

In step S60, the display module 16 displays a user interface of the determined fool-proofing function on the display screen 30.

All of the processes described above may be embodied in, and be fully automated via, functional code modules executed by one or more general-purpose processors. The code modules may be stored in any type of non-transitory computer-readable medium or other storage device. Some or all of the methods may alternatively be embodied in specialized hardware. Depending on the embodiment, the non-transitory computer-readable medium may be a hard disk drive, a compact disc, a digital video disc, a tape drive or other suitable storage medium.

The described embodiments are merely possible examples of implementations, set forth for a clear understanding of the principles of the present disclosure. Many variations and modifications may be made without departing substantially from the spirit and principles of the present disclosure. All such modifications and variations are intended to be included herein within the scope of this disclosure and the described inventive embodiments, and the present disclosure is protected by the following claims.

What is claimed is:

1. A computer-implemented method for adjusting fool-proofing functions of operations using an electronic device, the device having a computer to perform the method comprising:
presetting an algorithm corresponding to each of the operations, and ranges for triggering the fool-proofing functions of the operations;
obtaining an operation inputted by an operator;

calculating a skilled value of the operation according to reference parameters of the operator and an algorithm corresponding to the operation;

determining a fool-proofing function of the operation that is triggered by the electronic device according to the skilled value and the ranges for triggering the fool-proofing functions; and adjusting the electronic device to execute the determined fool-proofing function.

2. The method as described in claim 1, further comprising:

displaying a user interface of the determined fool-proofing function on a display screen of the electronic device.

3. The method as described in claim 1, wherein the reference parameters comprise a probability that errors occur on the operation, a seniority that indicates working years of the operator, and a performance score that evaluates the performance of the operator in daily work.

4. The method as described in claim 3, wherein the algorithm is denoted by $Fp(x)=(1-\alpha(x))\times\beta(x)\times\gamma(x)$, wherein $Fp(x)$ is the skilled value, $\alpha(x)$ is the probability, $\beta(x)$ is the seniority, and $\gamma(x)$ is the performance score.

5. The method as described in claim 1, wherein the determining step further comprises:

triggering a first fool-proofing function of the operation when the skilled value is in a first range, wherein the first fool-proofing function is used to display a record of errors of the operation on a display screen of the electronic device;

triggering a second fool-proofing function of the operation when the skilled value is in a second range, wherein the second fool-proofing function is used to display a dialog box on the display screen to remind the operator to confirm whether the operation needs to be executed; and triggering none of the fool-proofing functions of the operation when the skilled value is in a third range.

6. An electronic device for adjusting fool-proofing functions of operations, the electronic device comprising:

at least one processor; and a computer-readable storage medium storing one or more programs, which when executed by the at least one processor, causes the at least one processor to:

preset an algorithm corresponding to each of the operations, and ranges for triggering the fool-proofing functions of the operations;

obtain an operation inputted by an operator;

calculate a skilled value of the operation according to reference parameters of the operator and an algorithm corresponding to the operation;

determine a fool-proofing function of the operation that is triggered by the electronic device according to the skilled value and the ranges for triggering the fool-proofing functions; and adjust the electronic device to execute the determined fool-proofing function.

7. The electronic device as described in claim 6, wherein the one or more programs further causes the at least one processor to:

display a user interface of the determined fool-proofing function on a display screen of the electronic device.

8. The electronic device as described in claim 6, wherein the reference parameters comprise a probability that errors occur on the operation, a seniority that indicates working years of the operator, and a performance score that evaluates the performance of the operator in daily work.

9. The electronic device as described in claim 8, wherein the algorithm is denoted by $Fp(x)=(1-\alpha(x))\times\beta(x)\times\gamma(x)$, wherein $Fp(x)$ is the skilled value, $\alpha(x)$ is the probability, $\beta(x)$ is the seniority, and $\gamma(x)$ is the performance score.

10. The electronic device as described in claim 6, wherein the one or more programs further causes the at least one processor to:

trigger a first fool-proofing function of the operation when the skilled value is in a first range, wherein the first fool-proofing function is used to display a record of errors of the operation on a display screen of the electronic device;

trigger a second fool-proofing function of the operation when the skilled value is in a second range, wherein the second fool-proofing function is used to display a dialog box on the display screen to remind the operator to confirm whether the operation needs to be executed; and trigger none of the fool-proofing functions of the operation when the skilled value is in a third range.

11. A non-transitory computer readable storage medium having stored thereon instructions that, when executed by a processor of an electronic device, causes the electronic device to perform a method for adjusting fool-proofing functions of operations, the method comprising:

presetting an algorithm corresponding to each of the operations, and ranges for triggering the fool-proofing functions of the operations;

obtaining an operation inputted by an operator;

calculating a skilled value of the operation according to reference parameters of the operator and an algorithm corresponding to the operation;

determining a fool-proofing function of the operation that is triggered by the electronic device according to the skilled value and the ranges for triggering the fool-proofing functions; and adjusting the electronic device to execute the determined fool-proofing function.

12. The non-transitory computer readable storage medium as described in claim 11, wherein the method further comprises:

displaying a user interface of the determined fool-proofing function on a display screen of the electronic device.

13. The non-transitory computer readable storage medium as described in claim 11, wherein the reference parameters comprise a probability that errors occur on the operation, a seniority that indicates working years of the operator, and a performance score that evaluates the performance of the operator in daily work.

14. The non-transitory computer readable storage medium as described in claim 13, wherein the algorithm is denoted by $Fp(x)=(1-\alpha(x))\times\beta(x)\times\gamma(x)$, wherein $Fp(x)$ is the skilled value, $\alpha(x)$ is the probability, $\beta(x)$ is the seniority, and $\gamma(x)$ is the performance score.

15. The non-transitory computer readable storage medium as described in claim 11, wherein the determining step further comprises:

triggering a first fool-proofing function of the operation when the skilled value is in a first range, wherein the first fool-proofing function is used to display a record of errors of the operation on a display screen of the electronic device;

triggering a second fool-proofing function of the operation when the skilled value is in a second range, wherein the second fool-proofing function is used to display a dialog box on the display screen to remind the operator to confirm whether the operation needs to be executed; and triggering none of the fool-proofing functions of the operation when the skilled value is in a third range.

\* \* \* \* \*